(12) United States Patent
Nashio et al.

(10) Patent No.: US 10,427,475 B2
(45) Date of Patent: Oct. 1, 2019

(54) PNEUMATIC TIRE

(71) Applicant: TOYO TIRE & RUBBER CO., LTD., Osaka-shi, Osaka (JP)

(72) Inventors: Hiroshi Nashio, Osaka (JP); Takeshi Miyamoto, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 191 days.

(21) Appl. No.: 15/421,792

(22) Filed: Feb. 1, 2017

(65) Prior Publication Data

US 2017/0232805 A1 Aug. 17, 2017

(30) Foreign Application Priority Data

Feb. 15, 2016 (JP) .................................. 2016-026215

(51) Int. Cl.
*B60C 13/02* (2006.01)
*B60C 17/00* (2006.01)

(52) U.S. Cl.
CPC .......... *B60C 13/02* (2013.01); *B60C 17/0009* (2013.01)

(58) Field of Classification Search
CPC ..... B60C 13/00; B60C 13/001; B60C 13/002; B60C 13/02; B60C 13/023
See application file for complete search history.

(56) References Cited

U.S. PATENT DOCUMENTS

| 2009/0032161 A1 | 2/2009 | Yamaguchi |
| 2010/0038001 A1 | 2/2010 | Yamaguchi |
| 2012/0085473 A1 | 4/2012 | Matsuo et al. |
| 2013/0075006 A1 | 3/2013 | Kojima et al. |

FOREIGN PATENT DOCUMENTS

| CN | 102448739 A | 5/2012 |
| CN | 103072435 A | 5/2013 |
| JP | 2013-71637 | * 4/2013 |
| WO | 2007/032405 A1 | 3/2007 |
| WO | 2008/114668 A1 | 9/2008 |

OTHER PUBLICATIONS

Machine translation of JP 2013-71637, 2013.*
Office Action dated Jul. 26, 2018, issued in counterpart Chinese Application No. 2017100414778, with English translation. (10 pages).

* cited by examiner

*Primary Examiner* — Justin R Fischer
(74) *Attorney, Agent, or Firm* — Westerman, Hattori, Daniels & Adrian, LLP

(57) ABSTRACT

A pneumatic tire includes a plurality of projections formed on a surface of a tire side portion at an interval in a tire circumferential direction. A thickness of the projection is smaller than a width of a top surface of the projection in a tire circumferential direction. The thickness is a distance from the surface of the tire side portion to the top surface of the projection. The width of the projection is 10 mm or more. The interval of the projections is 3 times or more and 10 times or less as large as the thickness of the projection.

5 Claims, 13 Drawing Sheets

PNEUMATIC TIRE

CROSS-REFERENCE TO RELATED APPLICATIONS

This application claims priority of Japanese Patent Application No. 2016-26215 filed on Feb. 15, 2016, the content of which is incorporated herein by reference.

BACKGROUND OF THE INVENTION

Technical Field

The present invention relates to a pneumatic tire.

Related Art

International Publication WO2007/032405 and International Publication WO2008/114668 disclose a run flat tire where a plurality of projections is formed on tire side portions for air cooling. These projections intend to create turbulence in an air flow on surfaces of the tire side portions along with the rotation of the tire. Due to the creation of turbulence, a velocity gradient of an air flow in the vicinity of the surface of the tire side portion is increased and, hence, a heat radiation property of the tire is enhanced.

SUMMARY OF THE INVENTION

However, neither International Publication WO2007/032405 nor International Publication WO2008/114668 discloses the enhancement of a heat radiation property by techniques other than the creation of turbulence in an air flow in the vicinity of a surface of the tire side portion.

Accordingly, it is an object of the present invention to provide a pneumatic tire whose durability can be enhanced by effectively promoting heat radiation by air cooling.

Inventors of the present invention have made extensive studies on optimization (or maximization) of a velocity gradient of an air flow in the vicinity of a surface of a tire side portion. It has been known that when an object (for example, a flat plate) is disposed in the flow of a fluid, a speed of the fluid is rapidly lowered in the vicinity of a surface of the object due to viscosity of the fluid. Outside a region where the speed of the fluid rapidly changes (a boundary layer), a region where the speed of the fluid is not influenced by viscosity is formed. A thickness of the boundary layer is increased toward a downstream side from a front edge of the object. Although the boundary layer in the vicinity of the front edge of the object is a laminar flow (a laminar-flow boundary layer), the laminar-flow boundary layer is turned into a turbulent flow (a turbulent flow boundary layer) as the laminar-flow boundary layer flows toward a downstream side through a transitional region. Inventors of the present invention have found out that a velocity gradient of the fluid is large in the laminar-flow boundary layer so that heat radiation efficiency from the object to the fluid is high, and have completed the present invention based on such finding. That is, the inventors of the present invention have come up with an idea of applying a high heat radiation property in the laminar-flow boundary layer to air cooling of the pneumatic tire. The present invention has been made based on such a novel idea.

According to one aspect of the present invention, there is provided a pneumatic tire which includes a plurality of projections formed on a surface of a tire side portion at an interval in a tire circumferential direction. A thickness of the projection is smaller than a width of a top surface of the projection in a tire circumferential direction, which the thickness is a distance from the surface of the tire side portion to the top surface of the projection. The width of the projection is 10 mm or more. In addition, the interval between the projections is 3 times or more and 10 times or less as large as the thickness of the projection.

The projection has a shape where the thickness is smaller than the width so that an air flow in the vicinity of the top surface of the projection becomes a laminar flow during the rotation of the pneumatic tire. The air flow made of the laminar flow (a laminar-flow boundary) has a large velocity gradient and hence, heat radiation due to air cooling of the top surface of the projection can be effectively promoted. Further, the width of the projection is set to 10 mm or more and hence, the projection can sufficiently ensure a heat radiation area acquired by the formation of the laminar flow.

Also in this embodiment, the plurality of projections are disposed in the tire circumferential direction at an interval which is 3 times or more and 10 times or less as large as the thickness of the projection. That is, by properly setting the interval between the plurality of projections, it is possible to make an air flow which passes on the top surface of the projection in the form of a laminar flow impinge on the surface of the tire side portion between the projections. Accordingly, in addition to air cooling obtained by a laminar flow on the surface of the projection, it is possible to realize air cooling by a turbulent flow which is generated due to impingement of an air flow between the projections.

When the interval between the projections is less than 3 times as large as the thickness of the projection, the distance between the projections becomes short and hence, it is difficult to guide an air flow which passes on the top surface of the projection in between the projections whereby a cooling property enhancing effect between the projections is weakened. On the other hand, when the interval between the projections is more than 10 times as large as the thickness of the projection, the distance between the projections becomes excessively long and hence, a region where cooling property enhancing effect cannot be acquired is formed between a region where an air flow which passes on the top surface of the projection impinges on the surface of the tire side portion and the projection which is disposed adjacently to the region on a trailing side in a tire rotational direction and hence, a cooling property enhancing effect between the projections is weakened.

According to the pneumatic tire of the present invention, during the rotation of the pneumatic tire, an air flow which flows on the top surface of the projection formed on the surface of the tire side portion becomes a laminar flow and, further, an air flow between the projections becomes a turbulent flow and hence, heat radiation of the pneumatic tire by air cooling is effectively promoted whereby durability of the pneumatic tire is enhanced.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

First Embodiment

Figure 1:
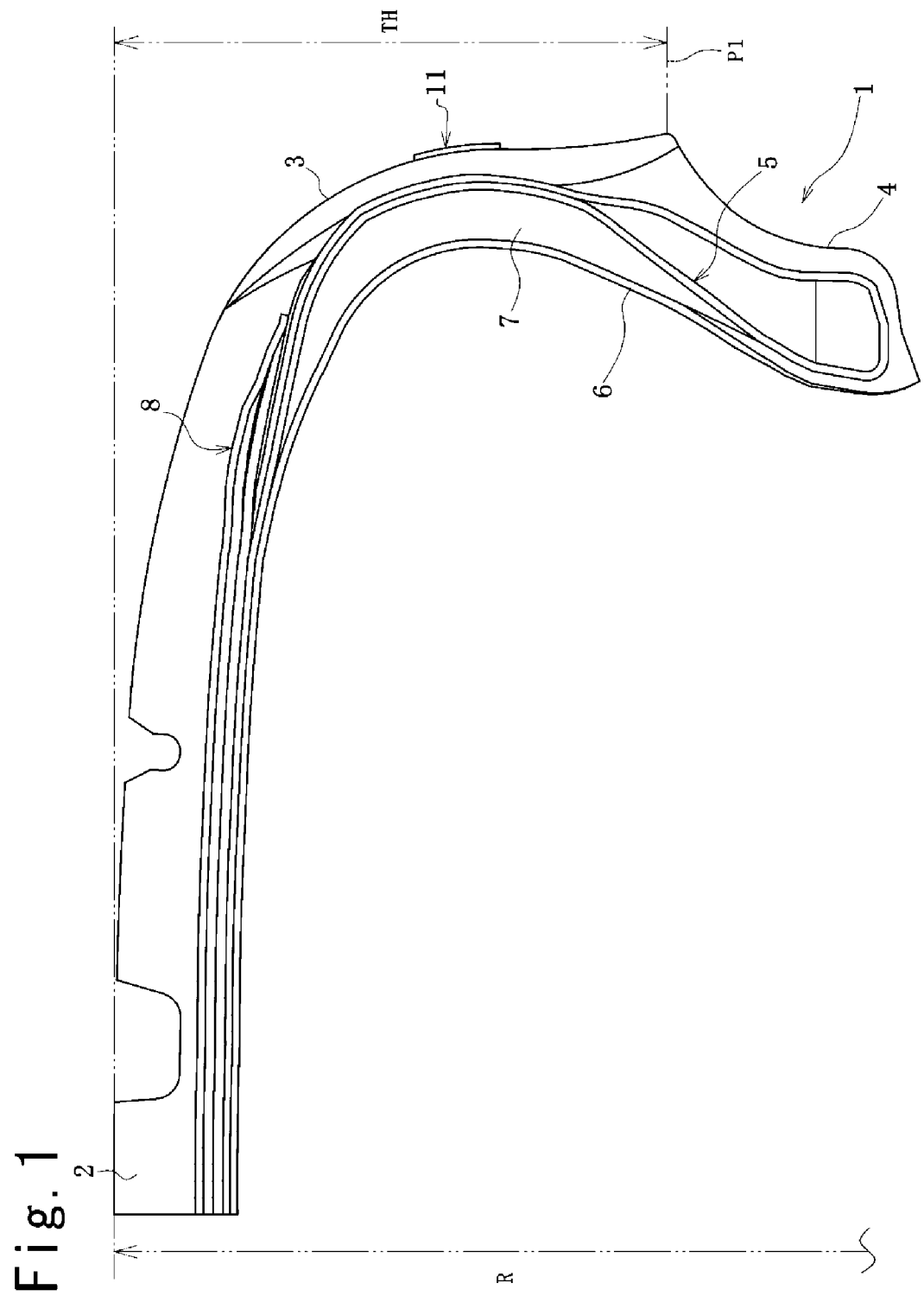
FIG. 1 is a meridian cross-sectional view of a pneumatic tire according to a first embodiment of the present invention.

FIG. 1 shows a rubber-made pneumatic tire (hereinafter referred to as a tire) 1 according to a first embodiment of the present invention. The tire 1 of this embodiment is a run-flat tire having a size of 245/40R18. The present invention is also applicable to tires having different sizes. The present invention is also applicable to tires not belonging to the category of run-flat tires. A rotational direction of the tire 1 is designated. The designated rotational direction is indicated by an arrow RD in FIG. 3.

The tire 1 includes a tread portion 2, a pair of tire side portions 3, and a pair of bead portions 4. Each bead portion 4 is disposed on an inner end portion of the tire side portion 3 in a tire radial direction (an end portion on a side opposite to the tread portion 2). A carcass 5 is disposed between the pair of bead portions 4. A reinforcing rubber 7 is disposed between the carcass 5 and an inner liner 6 on an innermost peripheral surface of the tire 1. A belt layer 8 is disposed between the carcass 5 and a tread surface of the tread portion 2. In other words, in the tread portion 2, the belt layer 8 is disposed outside the carcass 5 in a tire radial direction.

Figure 2:
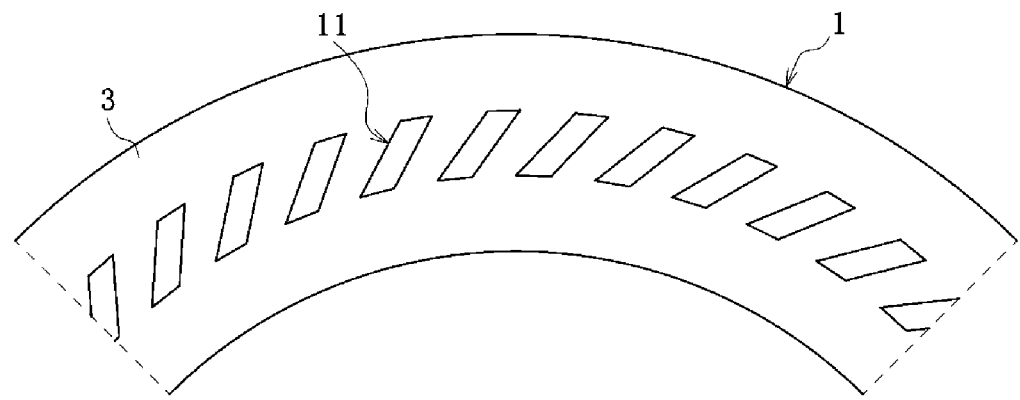
FIG. 2 is a partial side view of the pneumatic tire according to the first embodiment of the present invention.
Figure 3:
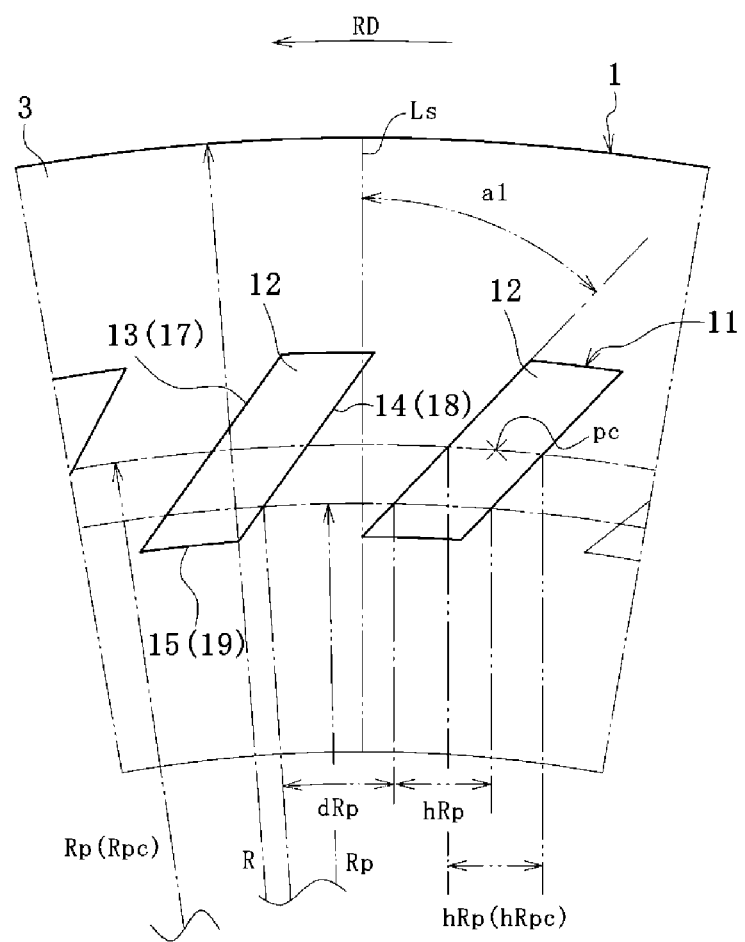
FIG. 3 is a partially enlarged view of the pneumatic tire shown in FIG. 2.

With reference to FIG. 2 and FIG. 3, a plurality of projections 11 is disposed on a surface of the tire side portion 3 at intervals in a tire circumferential direction. In this embodiment, these projections 11 have the same shape, the same size and the same posture. In FIG. 1, a distance from an outermost peripheral position P1 of a rim (not shown in the drawing) to an outermost position of the tread portion 1 in a tire radial direction (tire height) is indicated by symbol TH. The projection 11 can be disposed within a range of from 0.05 times to 0.7 times inclusive of the tire height TH from the outermost peripheral position P1 of the rim.

In this specification, a term of "plan view" or terms similar thereto may be used with respect to the shape of the projection 11 as viewed in a tire width direction. Further, a term of "end surface view" or terms similar thereto may be used with respect to the shape of the projection 11 as viewed from an inner end surface 15 side described later.

Figure 4:
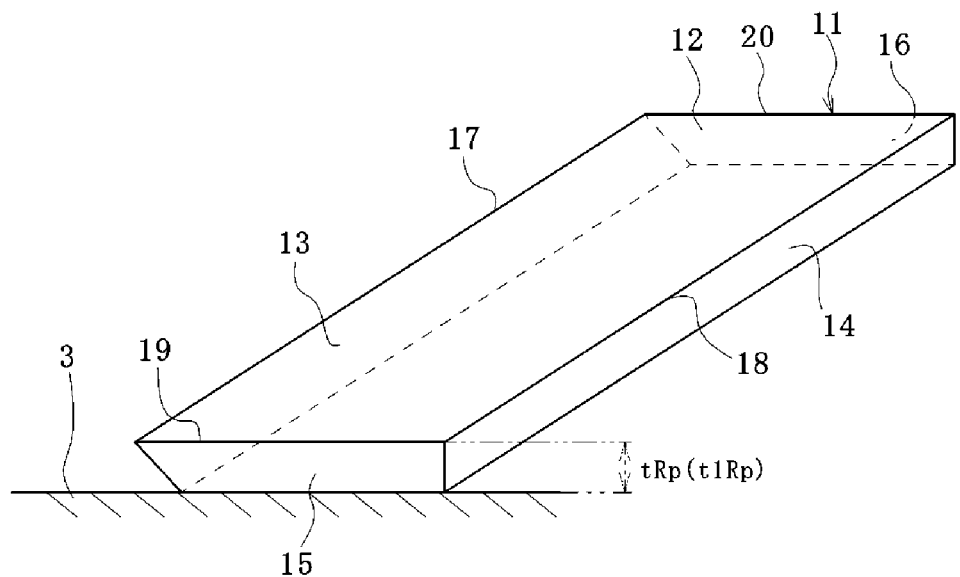
FIG. 4 is a perspective view schematically showing a projection.
Figure 5:
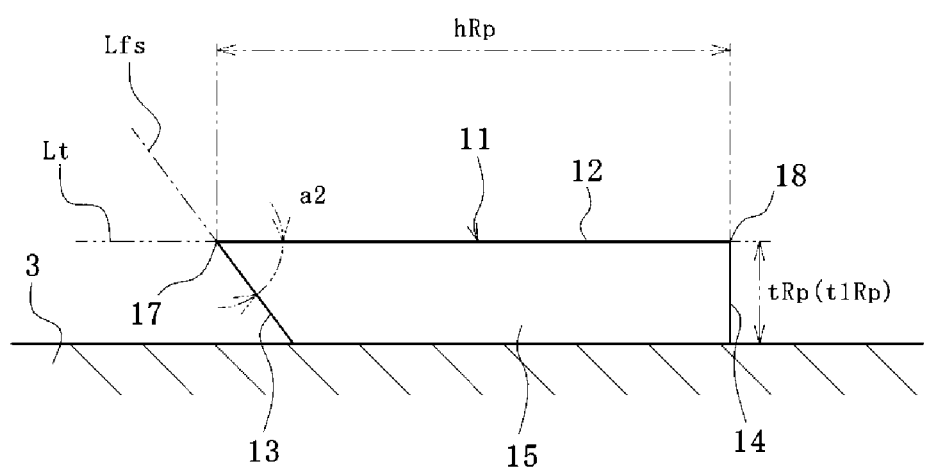
FIG. 5 is an end surface view of the projection.

With reference to FIG. 4 and FIG. 5, in this embodiment, the projection 11 has a top surface 12 which is a flat surface expanding along a surface of the tire side portion 3. The projection 11 also has a pair of side surfaces disposed opposite to each other in the tire circumferential direction, that is, a front side surface 13 and a rear side surface 14. The front side surface 13 is positioned on a leading side in the tire rotational direction RD, and the rear side surface 14 is positioned on a trailing side in the tire rotational direction RD. The projection 11 also has a pair of end surfaces disposed opposite to each other in the tire radial direction, that is, an inner end surface 15 disposed inside in the tire radial direction, and an outer end surface 16 disposed outside in the tire radial direction. As described later in detail, the front side surface 13 in this embodiment is a flat surface which is inclined with respect to a surface of the tire side portion 3 and the top surface 12. In this embodiment, the rear side surface 14, the inner end surface 15, and the outer end surface 16 are flat surfaces extending substantially perpendicular to the surface of the tire side portion 3.

A front side edge portion 17 is a portion where the top surface 12 and the front side surface 13 intersect with each other. A rear side edge portion 18 is a portion where the top surface 12 and the rear side surface 14 intersect with each other. An inner side edge portion 19 is a portion where the top surface 12 and the inner end surface 15 intersect with each other. An outer side edge portion 20 is a portion where the top surface 12 and the outer end surface 16 intersect with each other. As in the case of this embodiment, the front side edge portion 17, the rear side edge portion 18, the inner side edge portion 19, and the outer side edge portion 20 may be formed of an acute or clear edge. However, these side edge portions may have a shape that is curved to some extent as viewed in an end surface view. In this embodiment, all of the front side edge portion 17, the rear side edge portion 18, the inner side edge portion 19, and the outer side edge portion 20 have a straight line shape as viewed in a plan view. However, these side edge portions may have a curved shape such as an arcuate shape or an elliptical shape as viewed in a plan view. These side edge portions may have a shape formed of a bent line which is constituted of a plurality of straight lines. These side edge portions may also have a shape formed of a combination of a straight line and a curved line.

With reference to FIG. 3, the front side edge portion 17 is inclined with respect to a straight line which passes the front side edge portion 17 and extends in the tire radial direction as viewed in a plan view. In other words, the front side edge portion 17 is inclined with respect to the tire radial direction. An inclination angle a1 of the front side edge portion 17 with respect to the tire radial direction is defined as an angle (a clockwise direction being a positive direction as viewed in a plan view) made by a reference straight line Ls which passes a position on a most front side of the front side edge portion 17 in the tire rotational direction RD and extends in the tire radial direction and a direction along which the front side edge portion 17 extends (in this embodiment, the front side edge portion 17 per se which is a straight line).

Figure 12:
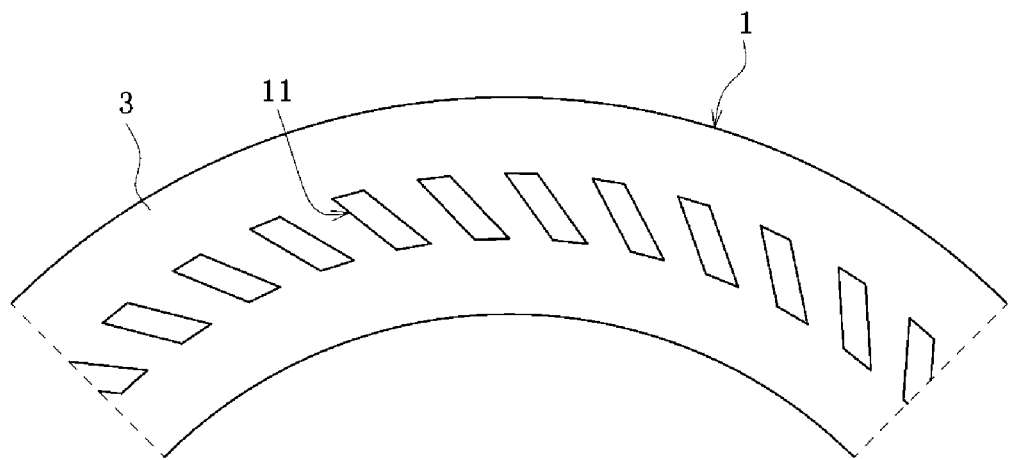
FIG. 12 is a side view of a portion of a pneumatic tire including projections having an inclination angle of a front side edge portion different from an inclination angle of a front side edge portion according to the first embodiment.
Figure 13:
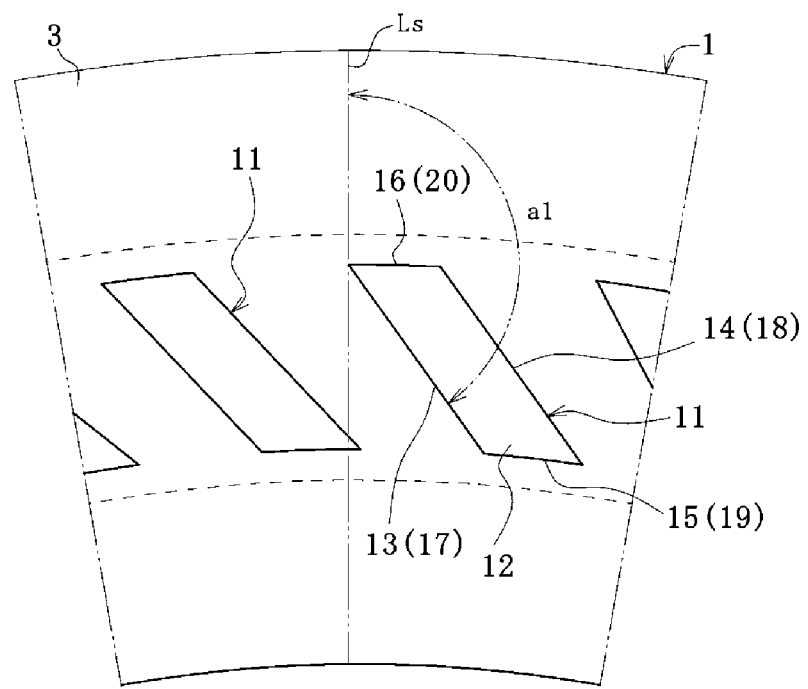
FIG. 13 is a partially-enlarged view of FIG. 12.

The front side edge portion 17 in this embodiment extends rightward and upward as viewed in a plan view. As shown in FIG. 12 and FIG. 13, the projection 11 may have a shape where the front side edge portion 17 extends rightward and downward as viewed in a plan view. The rear side edge portion 18 in this embodiment extends substantially parallel to the front side edge portion 17 as viewed in a plan view. Further, in this embodiment, the inner side edge portion 19 and the outer side edge portion 20 extend parallel to each other as viewed in a plan view.

With reference to FIG. 3, symbol R indicates a tire radius, and symbol Rp indicates a distance from the center of rotation of the tire to an arbitrary position of the projection 11 in the tire radial direction. Symbol Rpc in FIG. 3 indicates a distance from the center of rotation of the tire to the center pc of the projection 11 (for example, the center of figure of the top surface 12 as viewed in a plan view). Symbol hRp in FIG. 3 indicates a size of the projection 11 in the tire circumferential direction, that is, a width of the projection 11 at an arbitrary position in the tire radial direction. Symbol hRpc in FIG. 3 indicates the width of the projection 11 at the center pc of the projection 11. Symbol dRp indicates an interval between the projections 11 which are disposed adjacently to each other in a spaced-apart manner in the circumferential direction at an arbitrary position in the tire radial direction.

Also with reference to FIG. 5, in this embodiment, symbol tRp indicates a maximum thickness of the projection 11 at an arbitrary position of the projection 11 in the tire radial direction, and symbol t1Rp indicates a thickness of the projection 11 at the rear side edge portion 18. In this embodiment, a thickness of the projection 11 is uniform in the tire radial direction of the projection 11. Further, in this embodiment, a thickness of the projection 11 is uniform from the front side surface 13 (front side edge portion 17) to the rear side surface 14 (rear side edge portion 18). That is, a thickness of the projection 11 is uniform also in the tire circumferential direction of the projection 11. That is, in this embodiment, the maximum thickness tRp of the projection 11 at an arbitrary position in the tire radial direction and the thickness t1Rp of the projection 11 at the rear side edge portion 18 are equal to each other.

In this embodiment, at an arbitrary position in the tire radial direction, the interval dRp between the projections 11 disposed adjacently to each other in the circumferential direction is set 3 times or more and 10 times or less as large as the thickness t1Rp of the projection 11 at such a position at the rear side edge portion 18.

Figure 6:
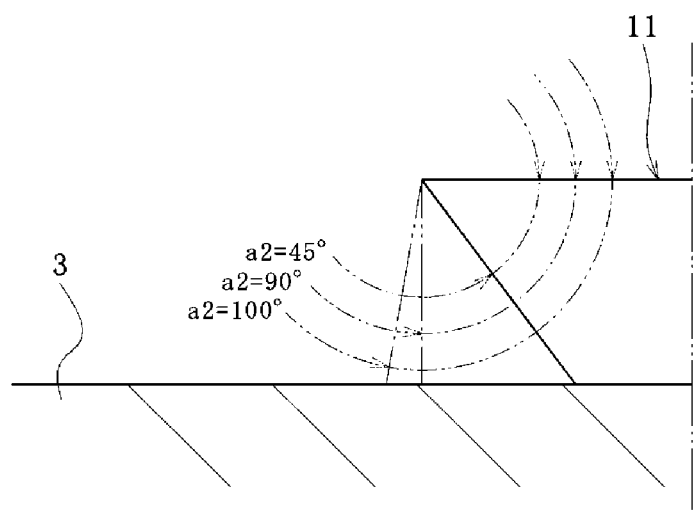
FIG. 6 is an end surface view of a portion of the projection for describing an angle of a tip end.

With reference to FIG. 5 and FIG. 6, as viewed in an end surface view, the top surface 12 and the front side surface 13 of the projection 11 make an angle (tip end angle a2) at the front side edge portion 17. In this embodiment, the front side surface 13 has an inclination such that an interval between the top surface 12 and the front side surface 13 is gradually narrowed toward the front side edge portion 17 so as to have a tapered shape. In other words, the inclination of the front side surface 13 is set such that a lower end of the front side surface 13 is positioned more on a trailing side in the tire rotational direction RD than the front side edge portion 17 as viewed in an end surface view. Since the front side surface 13 has such an inclination, the tip end angle a2 of the projection 11 in this embodiment is made of an acute angle (45°). The definition of the tip end angle a2 is specifically described later.

Figure 7:
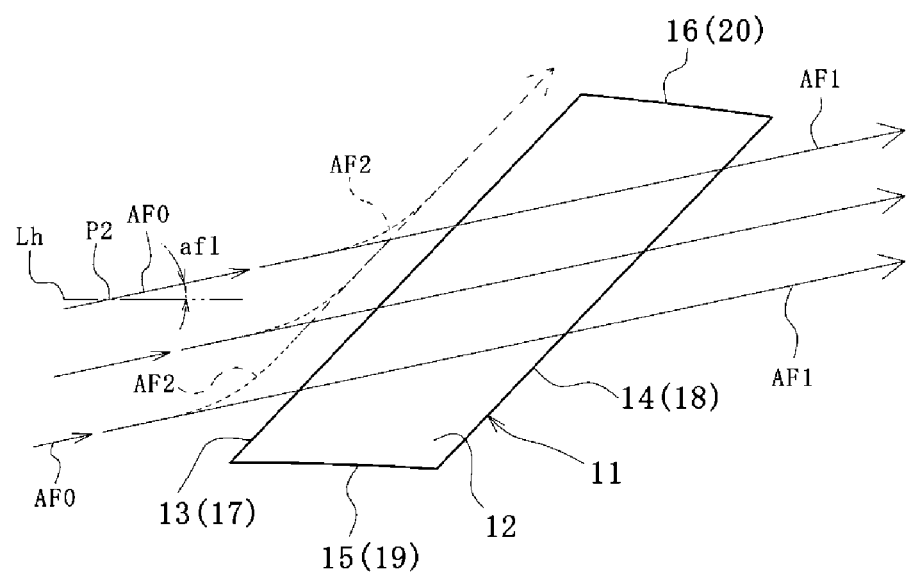
FIG. 7 is a plan view of the projection for describing an air flow path.
Figure 8:
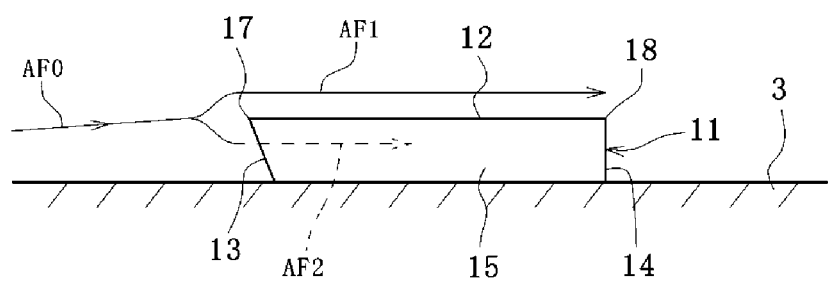
FIG. 8 is an end surface view of the projection for describing an air flow path.
Figure 9:
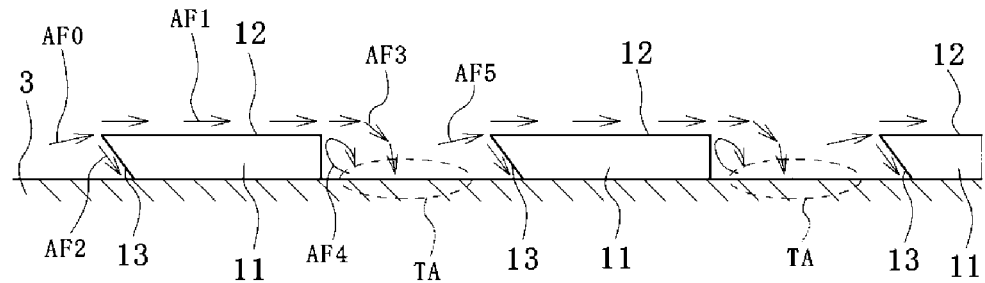
FIG. 9 is a schematic view for describing an air flow paths over the projection and between the projections.

With reference to FIG. 7 to FIG. 9, during traveling of a vehicle on which the tire 1 is mounted, as conceptually indicated by an arrow AF0, an air flow which flows to the projection 11 from a front side edge portion 17 side is generated in the vicinity of the surface of the tire side portion 3. With reference to FIG. 7, the air flow AF0 at a specific position P2 on the surface of the tire side portion 3 has an angle (flow-in angle af1) with respect to a perpendicular (horizontal line Lh) drawn from a straight line which passes the position P2 and extends in the tire radial direction. According to a result obtained from an analysis made by the inventors of the present invention, under conditions that a tire size is 245/40R18, a distance Rpc from the center of rotation of the tire to the center Pc of the projection 11 is 550 mm, and a traveling speed of the vehicle is 80 km/h, the flow-in angle af1 is 12°. When the traveling speed changes within a range of from 40 to 120 km/h, the flow-in angle af1 changes by an approximately ±1°. In an actual use of the tire, since the tire is influenced by various factors including a head wind, and a structure of the vehicle in addition to a traveling speed and hence, it is regarded that the flow-in angle af1 under the previously-mentioned conditions takes a value which falls within a range of approximately 12±10°.

With reference to FIGS. 7 to 9, an air flow AF0 flows to the projection 11 from the front side edge portion 17 and is divided into two air flows at the time of flowing into the projection 11. As shown in FIG. 7 most clearly, one air flow AF1 gets over the top surface 12 from the front side surface 13 and flows toward the rear side edge portion 18 from the front side edge portion 17 along the top surface 12 (main air flow). The other air flow AF2 flows toward the outside in the tire radial direction along the front side surface 13 (sub air flow). As shown in FIG. 12 and FIG. 13, when the front side edge portion 17 is formed to be extending rightward and downward, the air flow AF2 flows toward the inside in the tire radial direction along the front side surface 13.

Figure 10:
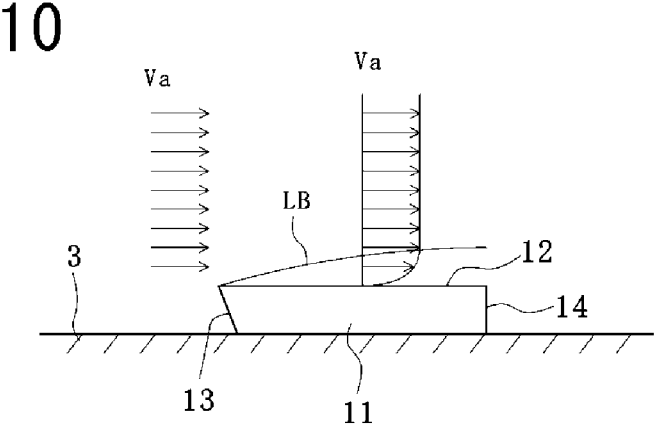
FIG. 10 is an end surface view of the projection for describing a boundary layer.

Also with reference to FIG. 10, the air flow AF1 which flows along the top surface 12 of the projection 11 forms a laminar flow. That is, a laminar-flow boundary layer LB is formed in the vicinity of the top surface 12 of the projection 11. In FIG. 10, symbol Va conceptually indicates a velocity gradient of the air flows AF0, AF1 in the vicinity of the surface of the tire side portion 3 and in the vicinity of the top surface 12 of the projection 11. Since the air flow AF1 which is a laminar flow has a large velocity gradient, heat is radiated from the top surface 12 of the projection 11 to the air flow AF1 with high efficiency. In other words, the air flow AF1 on the top surface 12 of the projection 11 forms a laminar flow and, hence, heat radiation by air cooling can be effectively promoted. Due to such effective air cooling, durability of the tire 1 is enhanced.

As indicated by an arrow AF4 in FIG. 9, stagnation of an air flow is generated on a back surface side (that is, a rear side surface 14 side) of the projection 11 with respect to the air flow AF0. A flow rate of the air flow AF4 in such stagnation is relatively small relative to a flow rate of a surrounding air flow and hence, the surrounding air flow is sucked so as to compensate for the air flow AF4 in the stagnation. Accordingly, as indicated by an arrow AF3, an air flow which passes on the top surface 12 and flows toward a downstream side from the rear side edge portion 18 is sucked by the stagnation (air flow AF4) on a back surface side of the projection 11 and falls toward the surface of the tire side portion 3 from the top surface 12. The air flow AF3 impinges on the surface of the tire side portion 3. As a result, an air flow in a region TA in the vicinity of the surface of the tire side portion 3 is turned into a turbulent flow between the projections 11, 11 disposed adjacently to each other. In this region TA, due to the increase of a velocity gradient brought about by the formation of the turbulent flow in the air flow, the heat radiation from the surface of the tire side portion 3 is promoted.

The air flow AF3 which impinges on the region TA flows toward the next projection 11 adjacently disposed on a trailing side in the tire rotational direction RD. In this embodiment, at an arbitrary position in the tire radial direction, the interval dRp between the projections 11 disposed adjacently to each other in the circumferential direction is set 3 times or more and 10 times or less as large as the thickness t1Rp of the projection 11 at the rear side edge portion 18 at such a position. With such a configuration, it is possible to make the air flow AF1 which passes on the top surface 12 of the projection 11 in the form of a laminar flow impinge on the surface of the tire side portion 3 between the projections 11 and, at the same time, it is possible to make the air flow AF5 reach the projection 11 adjacently disposed on a trailing side in the tire rotational direction RD. Accordingly, in addition to air cooling obtained by a laminar flow of the air flow AF1 on the top surface 12 of the projection 11, it is possible to realize air cooling by a turbulent flow which is generated due to impingement of the air flow AF3 between the projections 11.

When the interval dRp between the projections 11 is smaller than 3 times as large as the thickness t1Rp of the projection 11 at the rear side edge portion 18, the distance between the projections 11 becomes short and hence, it becomes difficult to make the air flow AF3 which flows out from the projection 11 impinge on the surface of the tire side portion 3 between the projections 11 whereby a cooling property enhancing effect between the projections 11 is weakened. On the other hand, when the interval dRp between the projections 11 is more than 10 times as large as the thickness t1Rp of the projection 11 at the rear side edge portion 18, the distance between the projections 11 becomes excessively long and hence, a region where cooling property enhancing effect cannot be acquired is formed between the region TA on which the air flow AF3 which passes on the top surface 12 of the projection 11 impinges and the projection 11 which is disposed adjacently to the region TA on a trailing side in the tire rotational direction RD and hence, a cooling property enhancing effect between the projections 11 is weakened.

As has been described heretofore, in the tire 1 of this embodiment, due to both the formation of a laminar flow in the air flow AF1 on the top surface 12 of the projection 11 and the formation of a turbulent flow in the air flow AF3 between the projections 11, 11, a heat radiation property of the tire 1 is enhanced.

Figure 11:
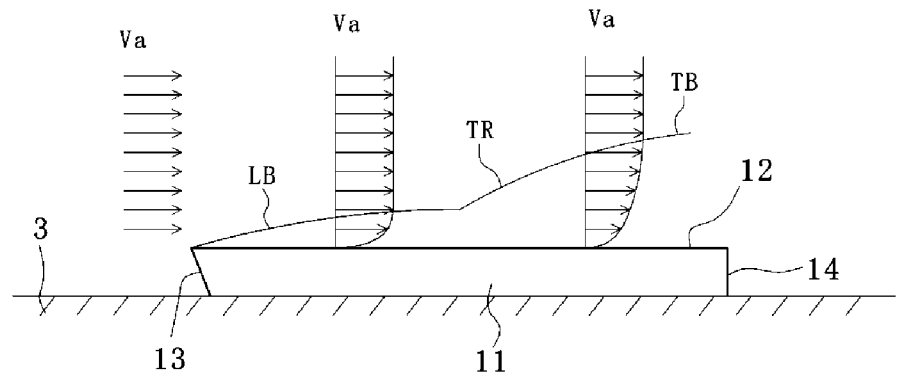
FIG. 11 is an end surface view of the projection for describing the boundary layer.

As described in detail later, it is desirable that the width hRp of the projection 11 at a position located at a distance Rp from the center of rotation of the tire (see FIG. 3) is set such that a laminar flow boundary layer LB is formed to the rear side edge portion 18 on the top surface 12 of the projection 11. However, as conceptually shown in FIG. 11, the width hRp of the projection 11 is allowed to have a relatively long size where a velocity boundary layer forms a transitional region TR or a turbulent flow boundary layer TB on the rear side edge portion 18 side (a downstream side) of the top surface 12 of the projection 11. Also in this case, in a region of the top surface 12 of the projection 11 where the laminar flow boundary layer LB is formed, the tire 1 can acquire an advantageous effect that a heat radiation property can be enhanced due to a large velocity gradient.

To divide the air flow AF0 into the air flows AF1, AF2 when the air flow AF0 flows to the projection 11 as described above, it is preferable that the thickness of the projection 11, particularly, the thickness of the projection 11 at portions corresponding to the front side edge portion 17 is set smaller than the width hp of the projection 11 (or a minimum width when the width hp is not fixed).

As described previously, the air flow AF0 which flows to the projection 11 has a flow-in angle af1. To divide the air flow AF0 into the air flows AF1, AF2, it is necessary to set the inclination angle a1 of the front side edge portion 17 of the projection 11 as viewed in a plan view such that an entry angle of the air flow AF0 with respect to the front side edge portion 17 does not become 90°. In other words, as viewed in a plan view, it is necessary to incline the front side edge portion 17 of the projection 11 with respect to the air flow AF0.

With reference to FIG. 3, as in the case of this embodiment, when the front side edge portion 17 is inclined rightward and upward as viewed in a plan view, it is preferable to set the front side edge portion 17 such that the front side edge portion 17 intersects with the air flow AF0 which flows to the front side edge portion 17 at an angle of 45°. In this case, as described previously, an entry angle af1 of the air flow AF0 is regarded as approximately 12±10° and, hence, it is preferable that the inclination angle a1 of the front side edge portion 17 is set to a value which falls within a range defined by the following formula (1).

[Formula 1]

$$23° \leq a1 \leq 43° \tag{1}$$

With reference to FIG. 13, when the front side edge portion 17 is inclined rightward and downward, it is preferable that the inclination angle a1 of the front side edge portion 17 is set such that the front side edge portion 17 intersects with the air flow AF0 which flows into the front side edge portion 17 at an angle of 45°. That is, it is preferable that the inclination angle a1 is set to a value which falls within a range defined by the following formula (2).

[Formula 2]

$$113° \leq a1 \leq 133° \tag{2}$$

In short, it is preferable that the inclination angle a1 of the front side edge portion 17 is set to satisfy the formula (1) or (2).

With reference to FIG. 5 and FIG. 6, to divide the air flow AF0 into the air flows AF1, AF2 when the air flow AF0 flows into the projection 11, it is preferable to prevent tip end angles a2 of the projection 11 from being set to excessively large values. To be more specific, it is preferable that the tip end angles a2 is set to 100° or less. It is more preferable that the tip end angles a2 is set to acute angles, that is, angles which are not more than 90°. It is not preferable that the tip end angles a2 is set to excessively small values because such setting of the tip end angles a2 causes lowering of strength of the projection 11 in the vicinity of the front side edge portion 17. Accordingly, it is preferable that the tip end angles a2 is set to a value which falls particularly within a range of from 45° to 65° inclusive.

With reference to FIG. 3, when the width hRp of the projection 11 at an arbitrary position in the tire radial direction is excessively narrow, an area of heat radiation from the projection 11 by the laminar flow boundary layer LB in the vicinity of the top surface 12 becomes insufficient and, hence, a sufficient heat radiation promoting effect by the laminar flow cannot be acquired. Accordingly, it is preferable that the width hRp of the projection 11 is set to 10 mm or more.

Further with reference to FIG. 3, it is preferable that the width hRp of the projection 11 at an arbitrary position in the tire radial direction is set such that the width hRp satisfies the following formula (3). In all formulae described hereinafter, an SI unit system is used.

[Formula 3] (3)
$$10 \leq hRp \times \left(\frac{Rp}{R}\right) \leq 50$$

R: tire radius R
Rp: distance from the center of rotation of tire to arbitrary position on projection
hRp: width of projection at position away from the center of rotation of tire by distance Rp When the width hRp is excessively small, a region where the velocity gradient is increased cannot be sufficiently ensured so that a sufficient cooling effect cannot be acquired. A lower limit value "10" in the formula (3) corresponds to a minimum required heat radiation area for ensuring a heat radiation promoting effect by the laminar flow.

When the width hRp is excessively large, the velocity boundary layer grows excessively on the projection 11 so that a velocity gradient becomes small thus deteriorating a heat radiation property of the tire 1. An upper limit value "50" in the formula (3) is defined from such a viewpoint. Hereinafter, the reason why the upper limit value is set to 50 is described.

It has been known that the growth of a velocity boundary layer on a flat plate, that is, the transition from the laminar flow boundary layer LB to the turbulent flow boundary layer TB is expressed by the following formula (4).

[Formula 4] (4)
$$x \cong 3 \times 10^5 \frac{v}{U}$$

x: distance from tip end of flat plate at which transition from laminar flow boundary layer to turbulent flow boundary layer occurs
U: flow-in velocity
v: kinematic velocity coefficient of fluid To take into account the influence of turbulence in a main flow and the lowering of a velocity gradient due to the growth of a boundary layer to some extent in the vicinity of the transition region, it is considered that a maximum value hRp_max of the width hRp of the projection 11 necessary for acquiring a sufficient cooling effect is approximately ½ of the distance x in the formula (4). Accordingly, the maximum width hRp_max of the projection 11 is expressed by the following formula (5).

[Formula 5] (5)
$$hRp\_max \cong 1.5 \times 10^5 \frac{v}{U}$$

A flow-in speed U of a fluid to the projection 11 is expressed as a product of a distance Rp from the center of rotation of the tire to an arbitrary position of the projection 11 in the tire radial direction and a tire angular velocity (U=Rpω). A vehicle speed V is expressed as a product of a tire radius R and the tire angular velocity (V=Rω). Accordingly, the relationship expressed by the following formula (6) is established.

[Formula 6] (6)
$$U = \frac{Rp}{R} V$$

With respect to a kinematic viscosity coefficient v of air, the following formula (7) is established.

[Formula 7]
$$v \cong 1.5 \times 10^{-5}$$ (7)

The following formula (8) is obtained by incorporating the formulae (6), (7) into the formula (5).

[Formula 8] (8)
$$hRp\_max \cdot \frac{Rp}{R} \cong \frac{2.25}{V}$$

Assuming a vehicle speed V as 80 km/h, hRp_max is expressed by the formula (8), as follows.

$$hRp\_max \cdot \frac{Rp}{R} \cong 100 (mm)$$ [Formula 9]

To take into account a condition of traveling at a high speed where heat generation of the tire 1 becomes more outstanding, to be more specific, to take into account a vehicle speed V up to 160 km/h, hRp_max is expressed by the formula (8).

$$hRp\_max \cdot \frac{Rp}{R} \cong 50 (mm)$$ [Formula 10]

In this manner, to form the laminar flow boundary layer LB over the entire top surface 12 of the projection 11 in the width direction even during a state of traveling at a high speed (vehicle speed V: 160 km/h or below), an upper limit value of the formula (3) becomes 50.

FIG. 12 to FIG. 14C show various alternatives of the shape of the projection 11 as viewed in a plan view.

The projection 11 shown in FIG. 12 and FIG. 13 has the front side edge portion 17 which extends rightward and downward as viewed in a plan view as described previously.

Figure 14A:
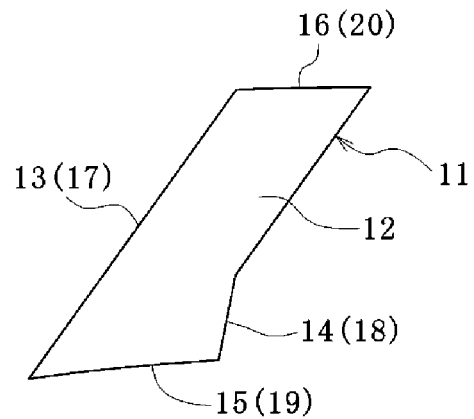
FIG. 14A is a view showing an alternative of the shape of the projection as viewed in a plan view.

The rear side edge portion 18 of the projection 11 shown in FIG. 14A has a shape formed of two straight lines which differ from each other in inclination angle as viewed in a plan view.

Figure 14B:
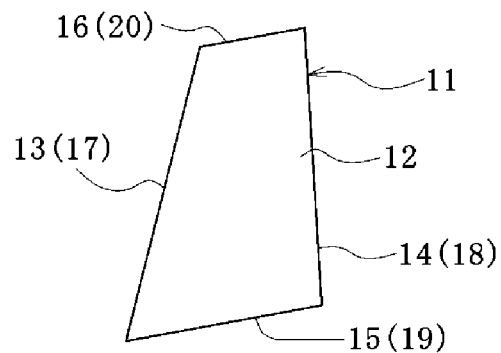
FIG. 14B is a view showing another alternative of the shape of the projection as viewed in a plan view.
Figure 14C:
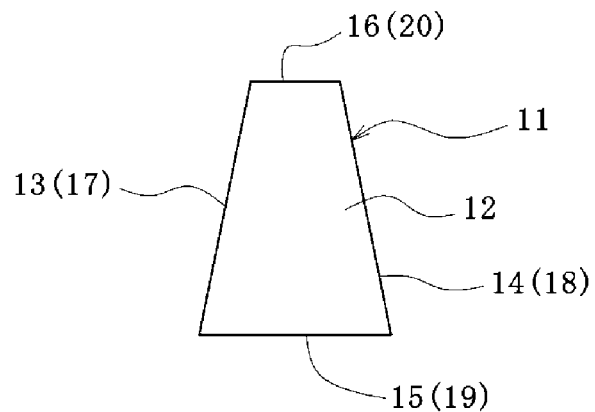
FIG. 14C is a view showing still another alternative of the shape of the projection as viewed in a plan view.

The projections 11 shown in FIG. 14B and FIG. 14C have shapes where the front side edge portion 17 extends rightward and upward and the rear side edge portion 18 extends rightward and downward as viewed in a plan view. Particularly, the projection 11 shown in FIG. 14C has an isosceles trapezoidal shape as viewed in a plan view.

Figure 15A:
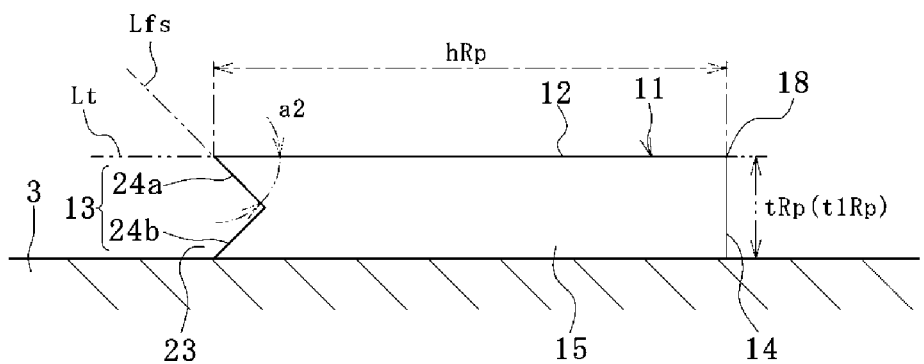
FIG. 15A is a view showing an alternative of the shape of the projection as viewed in an end surface view.

FIG. 15A to FIG. 163 show various alternatives relating to shapes of a front side surface 13 of the projection 11 as viewed in an end surface view.

The front side surface 13 of each of the projections 11 shown in FIG. 15A to FIG. 15D forms one recess 23 as viewed in an end surface view.

The front side surface 13 of the projection 11 shown in FIG. 15A is formed of two flat surfaces 24a, 24b. As viewed in an end surface view, the flat surface 24a extends rightward and downward and the flat surface 24b extends rightward and upward. The recesses 23 having a triangular shape as viewed in an end surface view are formed of these flat surfaces 24a, 24b.

Figure 15B:
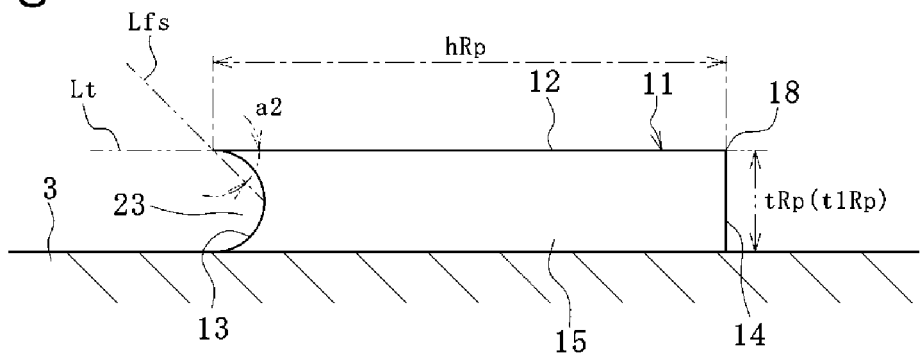
FIG. 15B is a view showing an alternative of the shape of the projection as viewed in an end surface view.

The front side surface 13 of the projection 11 shown in FIG. 15B is formed of a curved surface having a semicircular cross-sectional shape. Recesses 23 having a semicircular shape as viewed in an end surface view are formed by such a curved surface.

Figure 15C:
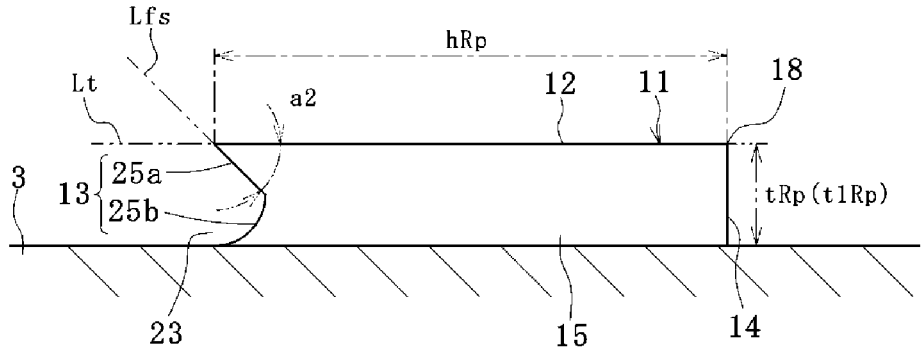
FIG. 15C is a view showing an alternative of the shape of the projection as viewed in an end surface view.

The front side surface 13 of the projection 11 shown in FIG. 15C is formed of a flat surface 25a extending rightward and downward as viewed in an end surface view, and a curved surface 25b having a circular cross-sectional shape. The flat surface 25a is positioned on a top surface 12 side of the projection 11, and the curved surface 25b is positioned on a surface side of the tire side portion 3. Recesses 23 are formed of the flat surface 25a and the curved surface 25b.

Figure 15D:
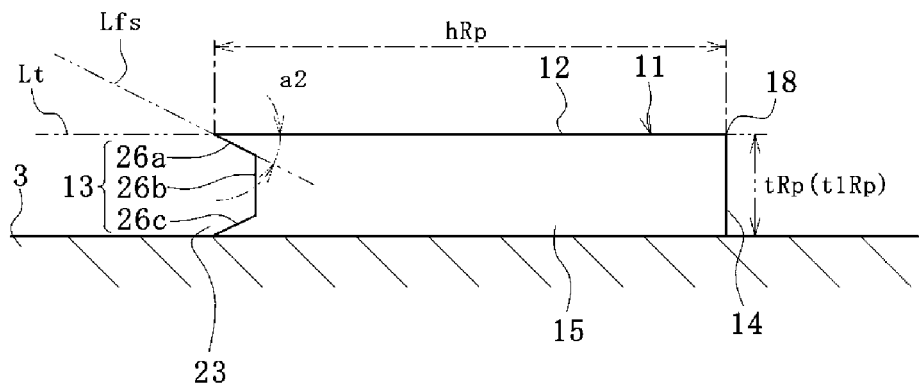
FIG. 15D is a view showing an alternative of the shape of the projection as viewed in an end surface view.

The front side surface 13 of the projection 11 shown in FIG. 15D is formed of three flat surfaces 26a, 26b, and 26c. As viewed in an end surface view, the flat surface 26a on a top surface 12 side of the projection 11 extends rightward and downward, the flat surface 26c on a surface side of the tire side portion 3 extends rightward and upward, and the flat surface 26b at the center extends in a tire width direction. Polygonal recesses 23 are formed by these flat surfaces 26a to 26c.

Figure 16A:
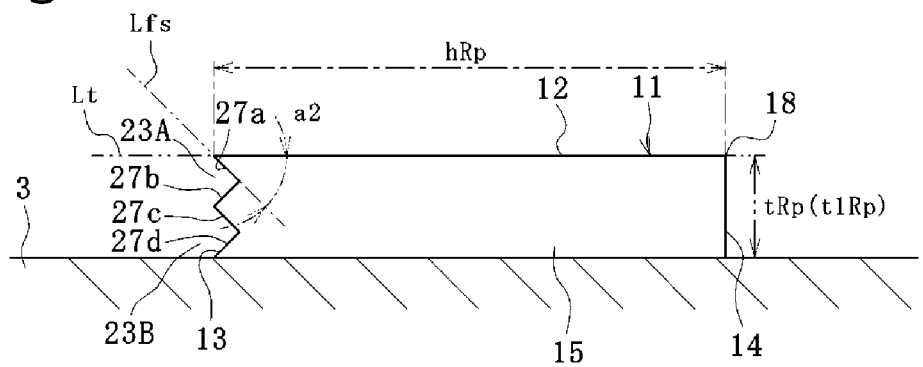
FIG. 16A is a view showing an alternative of the shape of the projection as viewed in an end surface view.
Figure 16B:
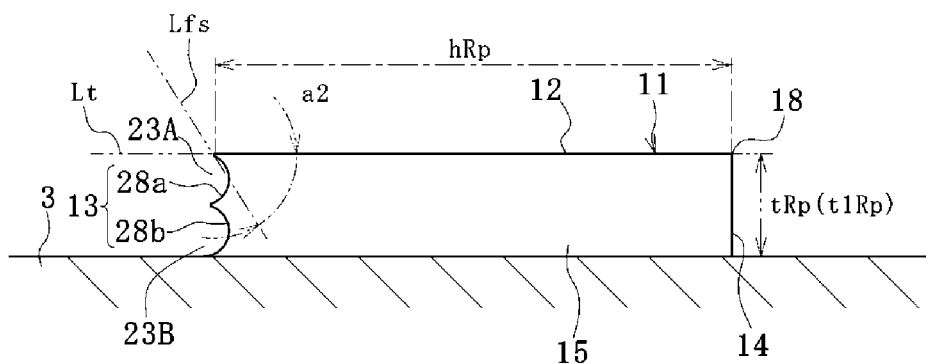
FIG. 16B is a view showing an alternative of the shape of the projection as viewed in an end surface view.

Each one of the front side surface 13 of the projection 11 shown in FIG. 16A and FIG. 16B is formed of two recesses 23A, 23B disposed adjacently to each other in a tire width direction as viewed in an end surface view.

The front side surface 13 of the projection 11 shown in FIG. 16A is formed of four flat surfaces 27a to 27d. As viewed in an end surface view, the flat surface 27a on a top surface 12 side of the projection 11 extends rightward and downward, and the flat surface 27b which extends rightward and upward, the flat surface 27c which extends rightward and downward, and the flat surface 27d which extends rightward and upward are sequentially arranged toward a surface of the tire side portion 3. One recess 23A having a triangular cross-sectional shape is formed on the front side surface 13 on a top surface 12 side of the projection 11 by the flat surfaces 27a, 27b, and one recess 23B having substantially the same triangular cross-sectional shape as the recess 23A is formed on the front side surface 13 adjacently to the recess 23A and on a side of a surface of the tire side portion 3 by the flat surfaces 27c, 27d.

The front side surface 13 of the projection 11 shown in FIG. 16B is formed of two curved surfaces 28a, 28b having a semicircular cross-sectional shape. One recess 23A having a semicircular cross-sectional shape is formed on the front side surface 13 by the curved surface 28a of the front side surface 13 on a top surface 12 of the projection 11 side, and one recess 23B substantially having the same semicircular cross-sectional shape as the recess 23A is formed on the front side surface 13 by the curved surface 28b adjacently to the recess 23A on a surface side of the tire side portion 3.

The front side surface 13 of the projection 11 may be formed of three or more recesses disposed adjacently to each other in a tire width direction as viewed in an end surface view.

By properly setting shapes, sizes and the numbers of the recesses formed on the front side surface 13 shown in FIG. 15A to FIG. 16B, it is possible to adjust a flow rate ratio between an air flow AF1 which flows along the top surface 12 of the projection 11 and an air flow AF2 which flows along the front side surface 13 of the projection 11.

With reference to FIG. 5 and FIG. 15A to FIG. 16B, an angle made by the top surface 12 and the front side surface 13 of the projection 11 on the front side edge portion 17, that is, a tip end angle a2 of the projection 11 is defined as an angle made by a straight line Lt which corresponds to the top surface 12 and a straight line Lfs which corresponds to a portion of the front side surface 13 in the vicinity of the front side edge portion 17 as viewed in an end surface view.

The straight line Lt is defined as a straight line which passes a position P3 of the top surface 12 having the largest thickness tRp, and extends along a surface of the tire side portion 3. With reference to FIG. 5 and FIG. 15A to FIG. 16B, since the each of the top surface 12 is a flat surface extending along a surface of the tire side portion 3, a straight line which is obtained by extending the top surface 12 per se as viewed in an end surface view is the straight line Lt.

With reference to FIG. 5, when the front side surface 13 is formed of a single flat surface, a straight line which is obtained by extending the front side surface 13 per se as viewed in an end surface view is the straight line Lfs. With reference to FIG. 15A to FIG. 15D, when the front side surface 13 is formed of a single recess 23, a straight line which connects the front side edge portion 17 and the most recessed position of the recess 23 as viewed in an end surface view is the straight line Lfs. With reference to FIG. 16A and FIG. 16B, when a plurality of recesses 23A, 23B (in this example, two recesses) are formed on the front side surface 13, a straight line which connects the front side edge portion 17 and the most recessed position of the recess 23A positioned on the most top surface 12 side as viewed in an end surface view is the straight line Lfs.

Second Embodiment

Figure 17:
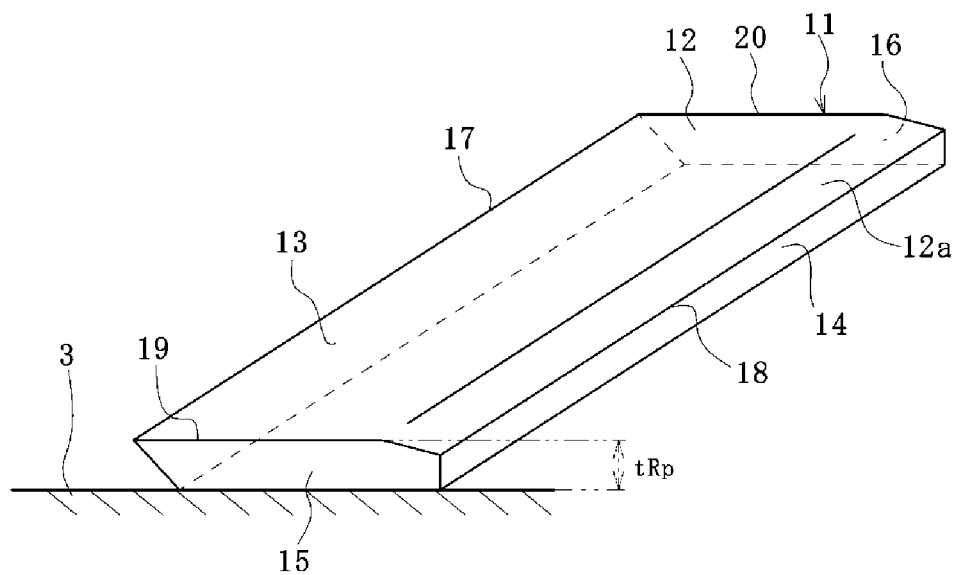
FIG. 17 is a schematic perspective view of a projection according to a second embodiment of the present invention.
Figure 18:
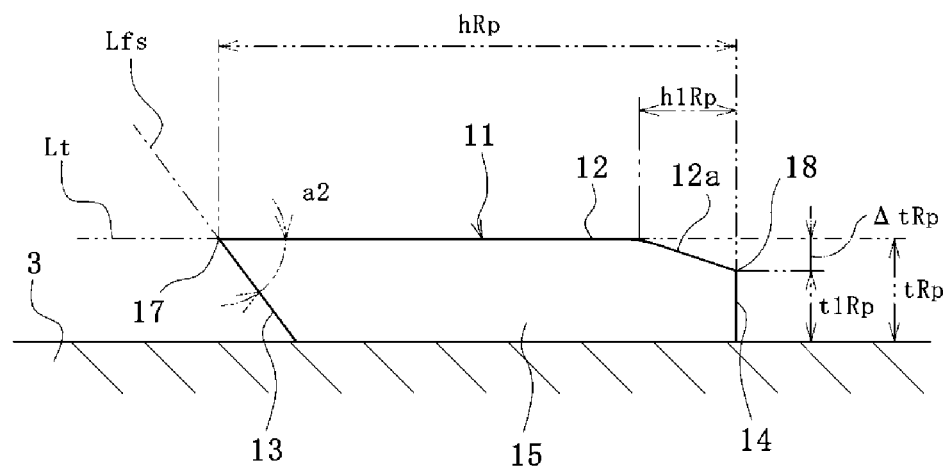
FIG. 18 is an end surface view of the projection shown in FIG. 17.
Figure 19:
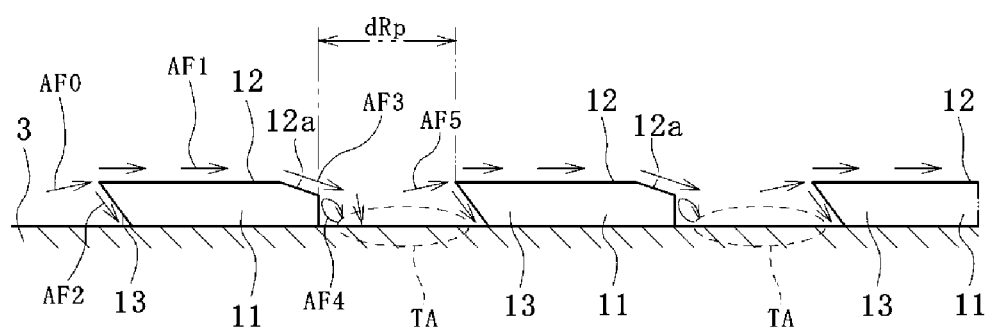
FIG. 19 is a schematic view for describing air flow paths over the projection shown in FIG. 17 and between the projections.

FIG. 17 to FIG. 19 are views for describing a second embodiment of the present invention. This embodiment is substantially equal to the first embodiment except for a point that a projection 11 in this embodiment differs from the projection 11 in the first embodiment in shape, and a point that a interval dRp between the projections 11 which are disposed adjacently to each other in a circumferential direction in this embodiment differs from the corresponding interval dRp in the first embodiment.

With reference to FIG. 17, a downward gradient surface portion 12a is formed on an end portion region of a top surface 12 of the projection 11 in this embodiment on a trailing side in a tire rotational direction RD. The downward gradient surface portion 12a is configured to have a downward gradient toward a surface of a tire side portion 3 as the downward gradient surface portion 12a extends toward a trailing side in the tire rotational direction RD thus gradually decreasing a thickness thereof.

FIG. 18 shows the projection 11 in FIG. 17 in cross section taken along a circumferential direction at an arbitrary position of the projection 11 in a tire radial direction. With reference to FIG. 18, symbol h1Rp indicates a size of the downward gradient surface portion 12a in the tire circumferential direction, that is, a width of the downward gradient surface portion 12a. Symbol t1Rp indicates a thickness of the projection 11 at a rear side edge portion 18. Symbol ΔtRp indicates a difference between a maximum thickness tRp of the projection 11 and the thickness t1Rp of the projection 11 at the rear side edge portion 18, and indicates a thickness reduction size of the projection 11 due to the downward gradient surface portion 12a.

As schematically shown in FIG. 19, an air flow AF1 which passes on the top surface 12 of the projection 11 flows along the downward gradient surface portion 12a of the projection 11 and hence, the air flow AF1 has a downward gradient toward the surface of the tire side portion 3. As a result, in cooperation with a sucking action generated by an air flow AF4 generated on a back surface side of the projection 11, the air flow AF1 impinges on a more upstream side of the surface of the tire side portion 3 between the projections 11 disposed adjacently to each other compared to the configuration described in the first embodiment.

That is, even when an interval dRp between the projections 11 is shortened, a turbulence effect brought about by the air flow AF3 can be acquired. Accordingly, by shortening the interval dRp between the projections 11, the number of projections 11 which can be formed on the surface of the tire side portion 3 can be increased or the width hRp of the top surface 12 of the projection 11 can be increased. In this case, a heat radiation area acquired by the laminar flow formed on the top surface 12 of the projection 11 can be further increased.

It is preferable that the width h1Rp of the downward gradient surface portion 12a is set to at least 5 mm. When the width h1Rp is shorter than 5 mm, a region where the air flow AF1 flows along the downward gradient surface portion 12a is short and hence, an effect of making the air flow AF1 flow in a downward gradient toward the surface of the tire side portion 3 is weakened.

In forming the downward gradient surface portion 12a on the projection 11, it is preferable that the interval dRp between the projections 11 disposed adjacently to each other is set based on the following formulae (11) and (12) using ΔtRp and h1Rp of the downward gradient surface portion 12a and the thickness t1Rp of the projection 11 at the rear side edge portion 18 as parameters, for example.

[Formula 11] (11)

$$3 < \frac{dRp}{t1Rp} + 10 \times t' < 10$$

dRp: distance between projections 11 at position away from center of rotation of tire by distance Rp t1Rp: thickness of projection 11 at rear side edge portion 18 at position away from center of rotation of tire by distance Rp t': inclination of downward gradient surface portion 12a as viewed in cross section in FIG. 18

[Formula 12] (12)

$$t' = \frac{\Delta Rp}{h1Rp}$$

ΔtRp: thickness reduction size by downward gradient surface portion 12a at position away from center of rotation of tire by distance Rp h1Rp: length of downward gradient surface portion 12a in tire circumferential direction at position away from center of rotation of tire by distance Rp According to the formulae (11) and (12), the larger the inclination t' of the downward gradient surface portion 12a (that is, the larger an amount of downward gradient toward the tire side portion 3), the smaller the interval dRp between the projections 11 disposed adjacently to each other can be set. That is, the larger the inclination t' of the downward gradient surface portion 12a, the more the air flow AF3 which passes on the top surface 12 of the projection 11 and flows toward a downstream side from the rear side edge portion 18 is directed toward a tire side portion 3 side. In this case, even when the interval dRp between the projections 11 is shortened, it is possible to easily make the air flow AF3 impinge on the surface of the tire side portion 3 between the projections 11.

The smaller the thickness t1Rp of the projection 11 at the rear side edge portion 18, the smaller the interval dRp between the projections 11 disposed adjacently to each other can be set. The position at which the air flow AF3 flows toward a downstream side from the projection 11 approaches closer to a tire side portion 3 side and hence, it is possible to easily make the air flow AF3 impinge on the tire side portion 3 between the projections 11 whereby the interval dRp can be shortened.

For example, assume the case where a thickness t1Rp of the projection 11 at the rear side edge portion 18 is set to 2.0 mm, and an inclination t' of the downward gradient surface portion 12a is set to 0.1. In this case, the interval dRp between the projections 11 can be set to 4 mm to 18 mm, and more preferably to 8 mm to 12 mm based on the formula (11). In other words, in the second embodiment, the interval dRp between the projections 11 can be set to 2 times or more and 9 times or less as large as the thickness t1Rp of the projection 11 at the rear side edge portion 18, and more preferably to 4 times or more and 6 times or less as large as the thickness t1Rp of the projection 11 at the rear side edge portion 18. Particularly, an upper limit value of the interval dRp can be shortened compared to the configuration described in the first embodiment.

Figure 20A:
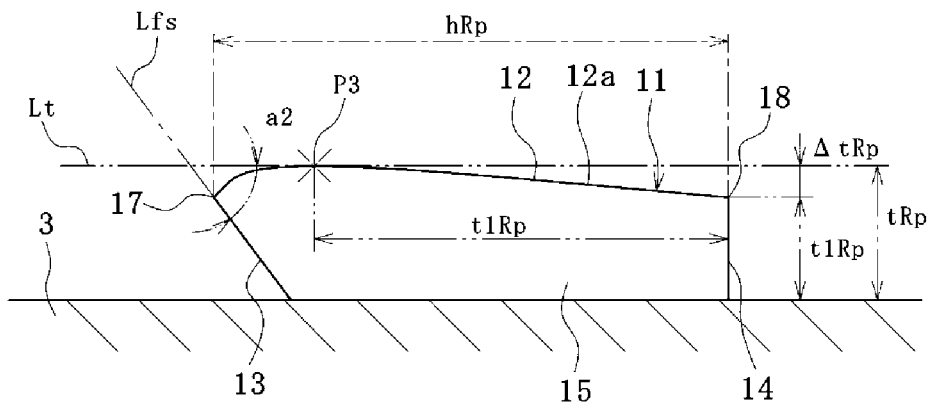
FIG. 20A is a view showing an alternative of the shape of the projection as viewed in an end surface view.
Figure 20B:
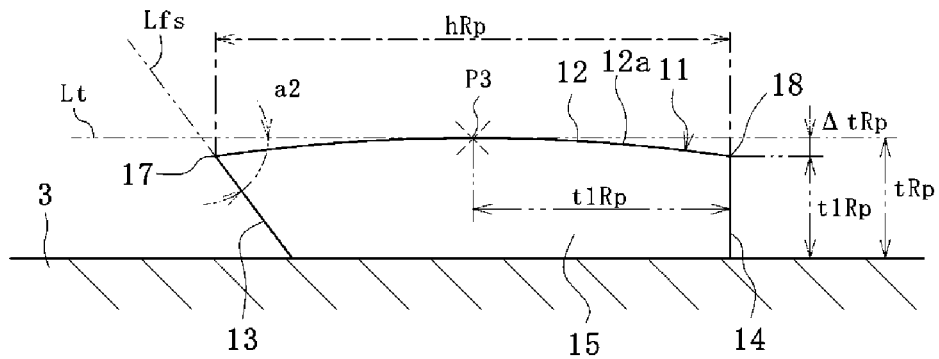
FIG. 20B is a view showing an alternative of the shape of the projection as viewed in an end surface view.
Figure 20C:
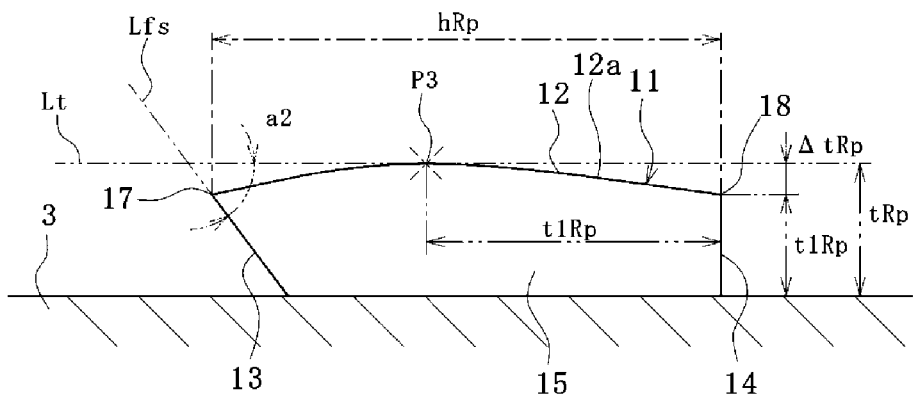
FIG. 20C is a view showing an alternative of the shape of the projection as viewed in an end surface view.

FIG. 20A to FIG. 20O are views showing various alternatives of the shape of the top surface 12 of the projection 11 according to the second embodiment as viewed in an end surface view. The projection 11 shown in FIG. 20A has a top surface 12 with a wing-like cross-sectional shape as viewed in an end surface view. The projection 11 shown in FIG. 20B has a top surface 12 with an arcuate shape as viewed in an end surface view. The projection 11 shown in FIG. 20C has a top surface 12 with a curved shape which is neither a wing-like cross-sectional shape nor an arcuate shape as viewed in an end surface view.

In the above-mentioned alternatives of the shape of the top surface 12 of the projection 11, a straight line which passes a position P3 of a top surface 12 where the thickness of the projection 11 become a maximum thickness tRp as viewed in an end surface view and extends along the surface of the tire side portion 3 becomes a straight line Lt. The shape of the surface 12 of the projection 11 may be formed by combining one of the shapes of the top surfaces 12 shown in FIG. 20A to FIG. 20C and any one of the shapes of the front side surfaces 13 shown in FIG. 15A to FIG. 16B described in the first embodiment.

What is claimed is:

1. A pneumatic tire, comprising a plurality of projections formed on a surface of a tire side portion at an interval in a tire circumferential direction, wherein
 a thickness of the projection is smaller than a width of a top surface of the projection in a tire circumferential direction, the thickness is a distance from the surface of the tire side portion to the top surface of the projection,
 the width of the projection is 10 mm or more, and
 the interval of the projections is 3 times or more and 10 times or less as large as the thickness of the projection,
 wherein the projection has a downward gradient surface portion formed on an end portion region of the top surface of the projection on a trailing side in a tire rotational direction, the downward gradient surface portion having a downward gradient toward the surface of the tire side portion as extending toward the trailing side in the tire rotational direction gradually decreasing the thickness, and
 wherein said downward gradient surface portion extends at the downward gradient downward from the top surface of the projection to a top end of a rear side surface of the projection, the top end of the rear side surface being at a height above the surface of the tire side portion.

2. The pneumatic tire according to claim 1, wherein a length of the downward gradient surface portion in the circumferential direction is at least 5 mm toward a leading side in the tire rotational direction.

3. The pneumatic tire according to claim 1, wherein the downward gradient surface portion has said downward gradient along the entire length of the downward gradient surface, whereby gradually decreasing the thickness along said entire length.

4. The pneumatic tire according to claim 1, wherein the rear side surface extends substantially perpendicular to the surface of the tire side portion.

5. The pneumatic tire according to claim 1, wherein the downward gradient surface is configured in accordance with the following formula:

$$3 < \frac{dRp}{t1Rp} + 10 \times t' < 10$$

wherein:
dRp is the distance of the interval between projections,
t1Rp is the thickness of the projection at the rear side surface from the top end of the rear side surface to the tire side portion, and
t' is the inclination of downward gradient of the downward gradient surface portion.

* * * * *